(No Model.)
C. F. DINKLE.
POWER TRANSMITTING DEVICE.
No. 573,768. Patented Dec. 22, 1896.
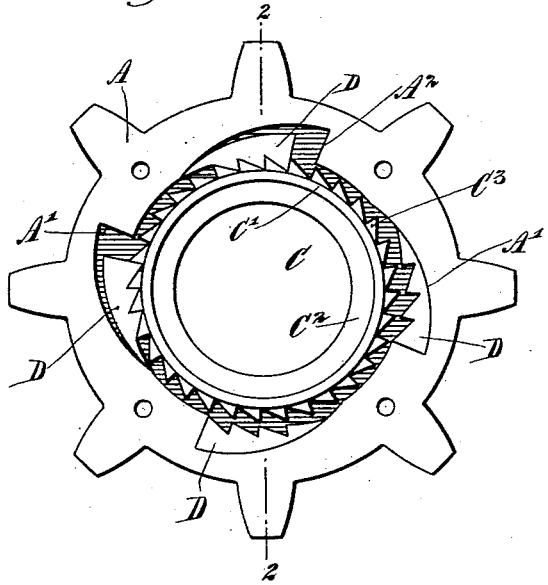
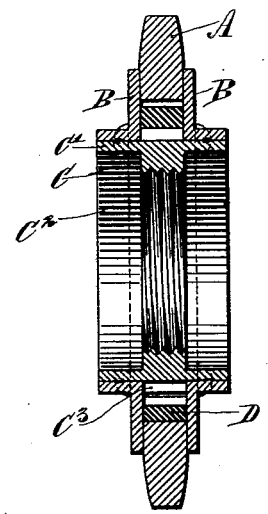
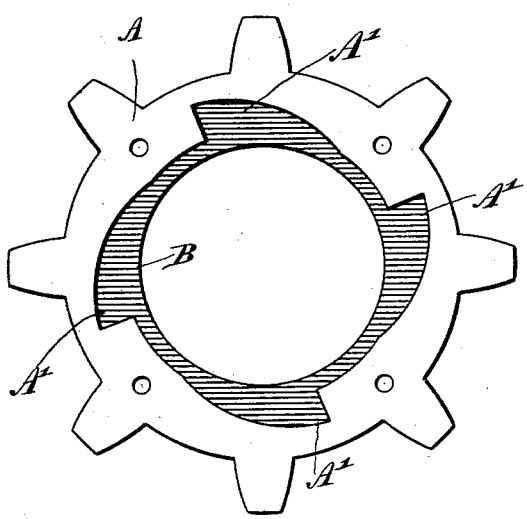
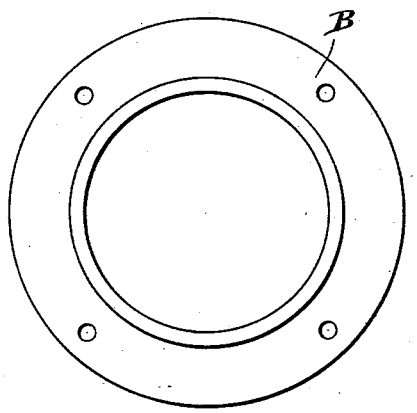
WITNESSES:
Edward Thorpe
Reo. G. Hoslin
INVENTOR
C. F. Dinkle.
BY
ATTORNEYS.
THE NORRIS PETERS CO., PHOTO-LITHO., WASHINGTON, D. C.

UNITED STATES PATENT OFFICE.

CHARLES F. DINKLE, OF CARLISLE, PENNSYLVANIA.

POWER-TRANSMITTING DEVICE.

SPECIFICATION forming part of Letters Patent No. 573,768, dated December 22, 1896.

Application filed May 18, 1896. Serial No. 591,970. (No model.)

*To all whom it may concern:*

Be it known that I, CHARLES F. DINKLE, of Carlisle, in the county of Cumberland and State of Pennsylvania, have invented a new and Improved Power-Transmitting Device, of which the following is a full, clear, and exact description.

The object of the invention is to provide a new and improved power-transmitting device which is simple and durable in construction, very effective in operation, more especially designed for use on bicycles and other light machinery, and arranged to permit the rider of a bicycle, for instance, to coast with the feet on the pedals, the latter remaining stationary while the drive-wheel continues to run by the momentum of the wheel.

The invention consists principally of a ratchet-wheel secured to the shaft, a transmitting-wheel loosely surrounding the said ratchet-wheel, and a series of toothed wedges held in wedge-shape recesses in the said transmitting-wheel and adapted to engage the said ratchet-wheel.

The invention also consists of certain parts and details and combinations of the same, as will be fully described hereinafter, and then pointed out in the claim.

Reference is to be had to the accompanying drawings, forming a part of this specification, in which similar characters of reference indicate corresponding parts in all the views.

Figure 1 is a side elevation of the improvement with one of the hub-flanges removed and as arranged for the drive-wheel of a bicycle. Fig. 2 is a transverse section of the same on the line 2 2 of Fig. 1. Fig. 3 is a face view of the transmitting-wheel with one of the hub-flanges removed. Fig. 4 is a face view of one of the hub-flanges, and Fig. 5 is a side elevation of one of the wedges.

On the sprocket-wheel A, for the rear or drive wheel of the bicycle, are secured the flanges B, forming a hub for the said wheel A, as plainly shown in Fig. 2. The hub is mounted to turn loosely on the rim C' of the wheel C, adapted to be fastened at its web $C^2$ on the hub for the rear wheel of the bicycle, either by screwing thereon or by other suitable fastening means. On the periphery of the rim C' are formed or secured ratchet-teeth $C^3$, adapted to be engaged by pawls D, held in recesses A', formed in the sprocket-wheel A, the said pawls being prevented from moving sidewise by the flanges B, forming the hub of the sprocket-wheel A.

Now it will be seen by reference to Fig. 1 that when motion to the right is given to the sprocket-wheel A some of the pawls D fall by their own gravity into engagement with the ratchet-teeth $C^3$, where they are wedged by the tapering walls of the recesses A' engaging their inclined backs, and consequently the rotary motion of the sprocket-wheel A is transmitted by the said pawls to the wheel C and consequently to the drive-wheel, on which the said wheel C is fastened.

When the rider of the bicycle, for instance, desires to coast, he holds the pedals in a stationary position with the feet resting thereon to permit the drive-wheel to continue in its forward motion as long as the momentum of the wheel lasts. When the operator commences to hold the pedals stationary, and consequently the wheel A, the forward motion of the ratchet-wheel C brings the base ends of the wedges D in engagement with the shoulders $A^2$ of the recesses A', and consequently the said wedges are pushed out of engagement with the teeth $C^3$ and remain inactive in the outer parts of the recesses A'. As soon as the operator again commences to set the pedals in motion the movement given to the sprocket-wheel A causes some of the pawls to again engage with the ratchet-teeth $C^3$ to transmit the motion of the pedals to the rear or drive wheel, as above described.

It is evident that the device can be used for various purposes besides the one mentioned, and as the device is very simple and durable in construction it is not liable to get out of order.

Having thus described my invention, I claim as new and desire to secure by Letters Patent—

A power-transmitting device, comprising a ratchet-wheel C formed of a rim C' having an internal web $C^2$ to engage the part to be driven and a central annular series of ratchet-teeth $C^3$ projecting from the periphery of the hub, a sprocket-wheel in the form of an annulus loosely fitting over said ratchet-teeth and provided in its inner wall with wedge-shape recesses A' terminating at their front ends in shoulders $A^2$, loose wedge-shape pawls mounted in said recesses with their wider ends next to said shoulders and having toothed lower edges to engage the ratchet-teeth in the forward movement of the sprocket and be released therefrom when the sprocket is stationary and the ratchet rotates forwardly, and side flanges B, B, inclosing the sides of the sprocket and ratchet wheels and holding the wedges from lateral displacement, substantially as shown and described.

CHARLES F. DINKLE.

Witnesses:
F. H. HOFFER,
E. S. DINKLE.